| United States Patent [19] | [11] 3,903,011 |
| Donnelly | [45] Sept. 2, 1975 |

[54] EXO-THERMIC HEAT TRANSFER

[75] Inventor: William R. Donnelly, Piqua, Ohio

[73] Assignee: Readi Temp, Inc., Piqua, Ohio

[22] Filed: Aug. 1, 1973

[21] Appl. No.: 384,728

[52] U.S. Cl............ 252/188.3 R; 44/3 R; 126/263; 252/70
[51] Int. Cl.² .......................................... C09K 5/00
[58] Field of Search.......... 252/188.3 R, 70; 44/3 R; 126/263

[56] References Cited
UNITED STATES PATENTS

| | | | |
|---|---|---|---|
| 2,261,221 | 11/1941 | Bruner | 126/263 |
| 2,680,063 | 6/1954 | Shapiro | 126/263 |
| 3,072,509 | 1/1963 | Barnhart | 149/2 |
| 3,328,136 | 6/1967 | Verakas | 252/188.3 R |
| 3,461,073 | 8/1969 | Crowell et al. | 252/70 |
| 3,475,239 | 10/1969 | Fearon et al. | 252/188.3 R |
| 3,702,302 | 11/1972 | Wilson | 252/70 |
| 3,766,079 | 10/1973 | Jackman | 252/188.3 R |

*Primary Examiner*—Benjamin R. Padgett
*Assistant Examiner*—Irwin Gluck
*Attorney, Agent, or Firm*—Jerome P. Bloom

[57] ABSTRACT

A composition for producing heat when contacted by water at a relatively uniform temperature up to about 260° F without appreciable generation of steam consisting essentially of a particulate primer material which is exothermic when contacted by water, a particulate inorganic oxide or salt which is highly exothermic when contacted by water, and a film-forming component which encapsulates the primer and inorganic oxide or salt in the dry state. A preferred primer is anhydrous calcium chloride, a preferred inorganic oxide is calcium oxide, and a preferred film-forming component is a combination of positively charged guar gum and anhydrous sodium tetraborate. A method and apparatus especially adapted for use of the composition are disclosed, in the heating of a packaged food product.

5 Claims, 3 Drawing Figures

PATENTED SEP 2 1975　　3,903,011

EXO-THERMIC HEAT TRANSFER

BACKGROUND OF THE INVENTION

This invention relates to a composition which, upon mixing with water, releases heat over an extended time period without substantial generation of steam, to a method of using the composition for heating by conduction, and to apparatus particularly adapted to carry out such method. More specifically, the composition of the invention comprises dry, particulate materials which may be stored indefinitely in the dry state, contacted with a specified amount of water when heat transfer is desired and then discarded. Because of the chemical reactions and changes in physical state undergone by the composition during contact with water, it cannot be regenerated for reuse.

Although not so limited the method and apparatus of the invention have particular utility in heating canned and/or frozen food products rapidly to the desired temperature for serving, in a safe and inexpensive manner.

While exothermic materials and/or mixtures of exothermic materials are well known in the art, to the best of applicant's knowledge no such compositions have been disclosed capable of producing a controlled degree or amount of heat over a period of, e.g. 15 minutes, without generation of steam. It will be understood that steam is objectionable from the standpoint of safety for use by the general public, it being necessary to avoid the possibility of scalding the user by an explosion of steam. Moreover, even if excessive steam production might not occur in some known exothermic compositions, the low viscosity of the liquid mixture produced upon addition of water would still create a real hazard of scalding the user by spattering or spillage of the liquid.

It is a primary object of the present invention to provide a composition which, when contacted with water, will rapidly produce heat at a relatively uniform temperature over an extended period of time without generation of appreciable amounts of steam, and which after addition of water is in the form of a viscous paste or gel not subject to spattering.

It is a further object of the invention to provide a method, and apparatus adapted to carry out the method, wherein the composition of the invention is caused to heat the contents of a container by conduction in an efficient, safe, and economical manner.

SUMMARY

The above and other incidental objects of the invention, which will be apparent from the following description, are attained in a composition which consists essentially of (1) a particulate primer material which is exothermic when contacted by water, (2) a particulate inorganic oxide or salt which is highly exothermic when contacted by water, and (3) a film-forming component which encapsulates the other components.

In broad range the composition of the invention consists essentially of the following components, in parts by weight:

about 80 to about 160 parts primer
about 25 to about 35 parts inorganic oxide or salt
about 15 to about 50 parts film-forming component.

With the above composition about 100 to about 180 parts by weight of water are combined in order to obtain the desired exothermic reaction.

The above components and the relative proportions therebetween are in every sense critical. Omission of any component or departure from the above ranges of proportions results in loss of one or more of the desired properties.

The primer, which is preferably hygroscopic, begins to dissolve in or react with water relatively rapidly upon introduction thereof, with consequent release of heat which, within about 20 seconds, raises the temperature of the added water to about 150°F. Insufficient primer results in slow initial heating and failure in or delay of the reaction of the water with the inorganic oxide or salt.

The inorganic oxide or salt, which is highly exothermic, reacts with the water after it has been heated by the primer and provides the principal source of heat by reaction with or dissolution in the water, increasing the temperature to a maximum of about 240° to about 260°F. An excess of inorganic oxide or salt must be avoided since this would generate steam and an uncontrollable maximum temperature. The minimum specified above should be observed in order to reach the desired temperature for efficient heating.

The film-forming or encapsulating component is highly critical since it prevents reaction between the other components in the dry state; upon addition of or exposure to water it permits limited contact of water with the primer, and most importantly controls and regulates contact of the water with the highly exothermic oxide or salt, thereby preventing a runaway reaction. Finally, the film-forming component forms a gel upon addition of or exposure to water to produce a viscous mixture having no apparent free liquid even at elevated temperature.

Control of the amount of water is necessary in order to prevent generation of steam and free liquid in the mixture.

An example of the method of the invention involves providing a sealed, rupturable container of the composition of the invention, immersing the container in a predetermined amount of water, positioning material to be heated in heat transfer relation with the water, rupturing said container whereby to cause said water to contact said composition with consequent production of heat, and causing heat to be transferred to said material by conduction while maintaining said water, composition and material under adiabatic conditions.

Apparatus according to the invention for practice of the above described method comprises an insulative housing, at least the upper portion of said housing being of flexible construction, a rupturable container disposed within said housing and resting on the bottom thereof, a supply of the composition of the invention being within said container, and an opening in the top of said housing through which water may be introduced to the interior of said housing, said opening being of a size and configuration to engage a package of material to be heated with a sliding fit, the arrangement being such that downward pressure upon said package causes flexure of said upper portion of said housing and rupture of said container by contact with the lower portion of said package.

As an alternative and important usage thereof, the invention contemplates a shelf package having indefinite storage capabilities in which is packaged, in the first instance, not only a container of food or other product required to be heated at a time of use but also the particulate composition of the invention and the water or other liquid required to excite and activate the same. Of course in this case the water and particulate composition of the invention will be separated until time of use by impermeable material forming sub containers in the shelf type package, at which time the separating material may be broken to expose the particulate composition to its activating liquid.

BRIEF DESCRIPTION OF THE DRAWINGS

Reference is made to accompanying drawings wherein.

DESCRIPTION OF THE PREFERRED EMBODIMENTS

Figure 1:
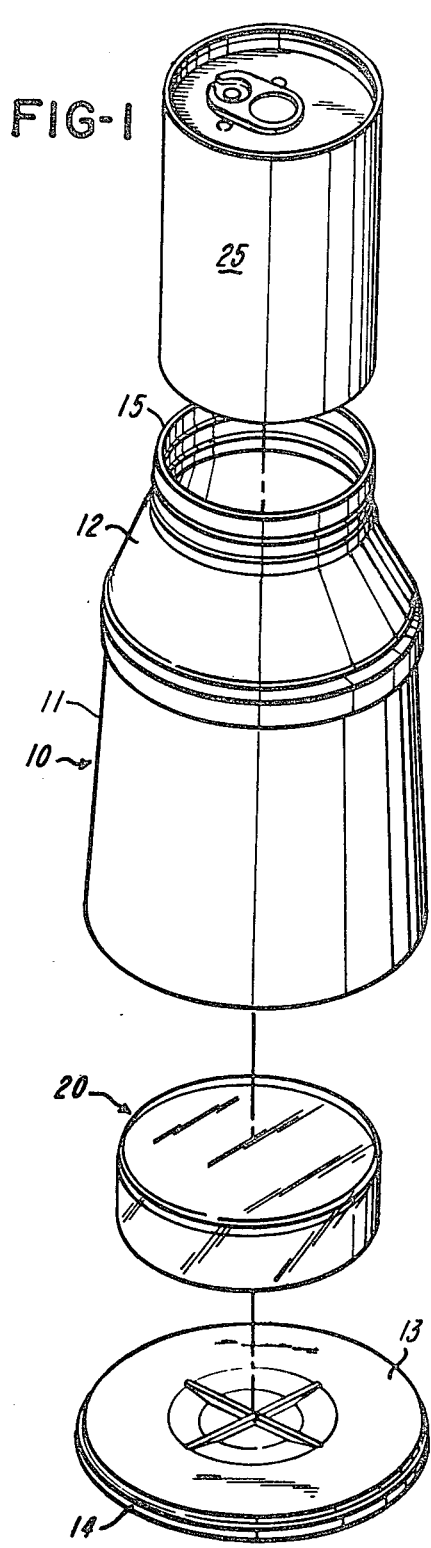
FIG. 1 is an exploded perspective view of a preferred embodiment of the apparatus of the invention, including a package of material to be heated.

Suitable materials for the primer component of the composition of the invention include calcium chloride, cerous chloride, cesium hydroxide, sodium carbonate, ferric chloride, mangnesium perchlorate, and mixtures thereof. All these compounds should be in the anhydrous form, and may be used either in powdered, granular, or prilled condition. These compounds dissolve in or react with water with evolution of heat, and most are hygroscopic. Calcium chloride is the preferred compound in the present composition because of its ready availability and low cost. Moreover, anhydrous calcium chloride is extremely hygroscopic (classified as deliquescent) and liberates considerable amounts of heat when in contact with water.

Inorganic oxides or salts suitable for use in the composition include calcium oxide, aluminum bromide, calcium aluminum hydride, aluminum chloride, calcium nitrate, sulfur trioxide (alpha form), and mixtures thereof. All these compounds should be in the anhydrous form and may be used in powdered or granular condition. All these compounds produce a highly exothermic reaction when contacted with water. Calcium oxide is the preferred compound in the composition of this invention because of its ready availability and low cost. Calcium oxide liberates about 15,500 calories of heat per gram molecular weight when slaked with water.

The film-forming or encapsulating component of the composition comprises positively charged guar gum and anhydrous sodium tetraborate (borax). In the broad composition range hereinabove set forth, the guar gum comprises from about 7 to about 20 parts by weight while the anhydrous borax comprises from about 8 to about 30 parts by weight.

Guar gum is derived from the ground endosperms of Cyamopsis tetragonolobus (cultivated in India). It contains about 35% galactose and about 63% mannose. As is well known these are aldohexoses, the D(+) forms thereof being stereoisomers of D(+) glucose. This material is available in a form wherein the galactose-mannose rings are treated with a positive charge to become a polysaccharide, in which form it is known as Jaguar Plus. (See The Merck Index, 8th Edition, page 512.)

The guar gum has the property of forming a gel-like film in the presence of water, and anhydrous borax enhances and strengthens the gel.

A preferred composition of the invention has the following analysis in weight percent:
About 66.7% calcium chloride (anhydrous)
About 16.7% calcium oxide
About 5.5% Jaguar Plus
About 11.1% Borax (anhydrous)

The composition is prepared in the following manner:

Calcium oxide is introduced into a receptacle of nonconductive material, e.g., glass, ceramic, or plastic. Jaguar Plus and borax are then added and the mixture is agitated in order to cause the Jaguar Plus and borax to encapsulate the calcium oxide. Calcium chloride is next added and the entire mixture is again agitated, causing the Jaguar Plus to coat the other material. In this connection, it should be noted that the other materials are negatively charged, thereby facilitating adherence of the positively charged Jaguar Plus.

Water is added to the above preferred formulation in a weight ratio of about 0.55:1 to about 1:1 of water:dry composition.

Upon addition of water the Jaguar Plus and borax form a gel around the encapsulated calcium chloride and calcium oxide particles. Because of the highly hygroscopic nature of the calcium chloride, it attracts water from the gel and begins to generate heat. Within 20 seconds or less the heat liberated by the calcium chloride particles causes a break-down of the Jaguar and borax film and the temperature of the mixture rises to about 150° F. This in turn causes a break-down of the film surrounding the calcium oxide particles, so that these particles start reacting with water.

Reaction of the calcium oxide with water causes a gradual increase in the temperature of the mixture up to a maximum of about 240° to about 260°F. However, the gel-like structure of the mixture prevents an extremely rapid temperature rise and hence tends to extend the duration of the exothermic action up to about 15 minutes at a relatively uniform temperature. Moreover, the boiling point is increased by solution of the calcium chloride in water, and this, coupled with the gel-like structure and control over the amount of water, prevents the generation of any substantial amount of steam, despite the fact that a maximum temperature of up to 260° F. may be reached.

No particular precaution need be taken when adding the water, and ordinary tap-water may be used at ambient or room temperature. For more rapid heating, the mixture may be agitated after addition of the water since this accelerates the break-down of the film surrounding the particles as a result of fluid friction.

Figure 2:
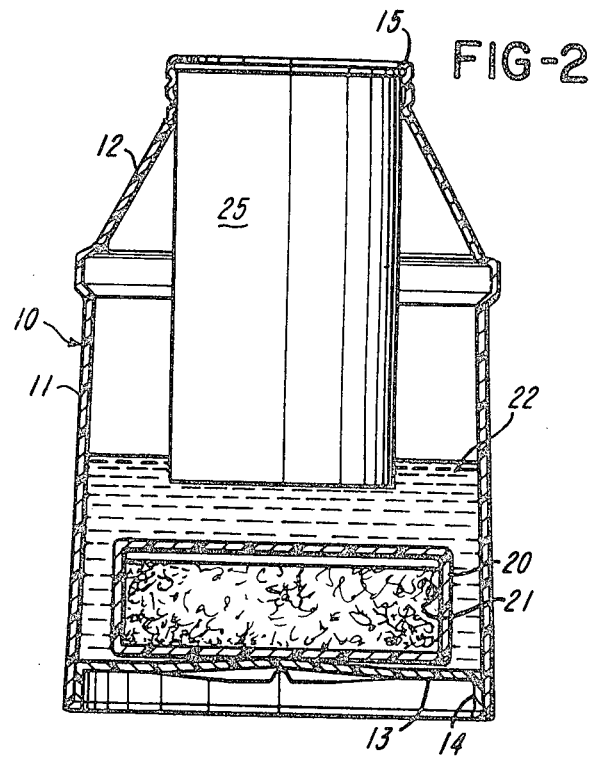
FIG. 2 is a vertical sectional view of the apparatus of FIG. 1, showing the positioning of a package of material to be heated after addition of water.
Figure 3:
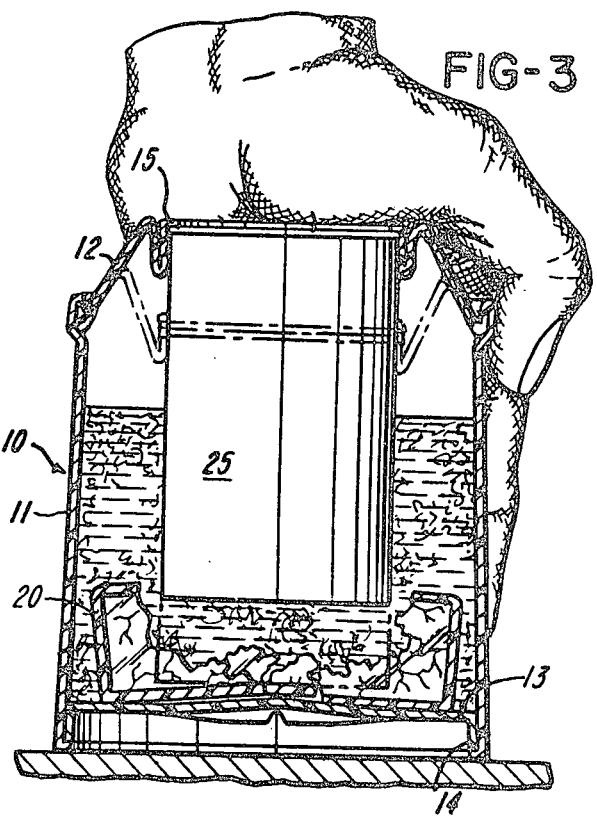
FIG. 3 is a view similar to that of FIG. 2 showing the manner in which the heating is initiated.

Referring to the drawings, an apparatus particularly adapted for heating a container with the composition of the present invention is illustrated. In FIGS. 1 – 3, a housing is indicated generally at 10 which is formed of a thermo-insulative material. The housing comprises a side wall 11, preferably of generally cylindrical configuration, and an inwardly tapering upper portion 12 which may be formed with pleats in order to provide flexibility or compressibility. However, as illustrated in the drawings, it is within the scope of the invention to provide an upper portion of unpleated relatively thin flexible resin or synthetic rubber which is self-stabilizing yet subject to displacement under pressure.

A bottom closure 13 is provided which is also thermally insulative and is preferably formed with a downwardly depending flange 14 so as to facilitate a watertight press fit and a seal thereof with the side walls 11.

The upper portion 12 of the housing terminates in means defining an internal shoulder 15, preferably circular, of such size as to engage a package or cannister containing material to be seated with a sliding fit.

A container 20 formed of any material which is easily ruptured or broken is provided to hold the exothermic composition, indicated at 21 in FIGS. 2 and 3. The container 20 will of course be of a size and configuration to permit it to rest on the bottom closure 13 of the housing 10. The assembly of the housing 10 and container 20 with the exothermic composition 21 enclosed therein, can be stored conveniently for an indefinite length of time. When it is desired to use it, a predetermined amount of water, which may be indicated by a mark or other indicia (not shown) on the side wall 11, is introduced to the interior of the housing through the opening defined by shoulder 15, the water being shown at 22 in FIGS. 2 and 3. Next, a package of material to be heated, indicated generally at 25, e.g., a can of food or soup which may be either frozen or at room temperature, is inserted in the opening defined by shoulder 15 and caused to slide downwardly to the position shown in FIG. 2, in which position it forms a seal of the housing 10. In order to start heating the contents of container 25, it is pressed down sharply by the hand of the user, as shown in FIG. 3, causing the movement therewith of the shoulder 15 and the collapse on itself of the wall portion 12, whereby the lower portion of can 25 ruptures the container 20 so that the water 22 gains access to the exothermic composition 21. At this point shaking or agitation of the contents of the housing 10 will accelerate the heating action which will result as previously described.

Utilizing an arrangement of the type described above, it has been found that 180 grams of the preferred exothermic composition, to which is added 100 grams of water, heats an 8 ounce can of food or soup from room temperature to the desired serving temperature in about 3 to 5 minutes. If a can of food is removed from the freezing compartment of a refrigerator (about −20°F) it can be heated to the desired temperature in about 5 to 10 minutes.

In an alternative use of the invention apparatus to provide a shelf package having indefinite storage capabilities and per se embodying the water or other liquid required for exciting or activating the exothermic invention composition, the same housing 10 may be employed but in this case the container 25 of the product to be heated at the time of use will be installed as shown in FIG. 2 of the drawings in the first instance. An additional seal may be provided over the exposed end of the container 25 and the upper end of the housing 10 as circumstances may dictate. In such event the container 25 will be installed prior to closure of the bottom of the housing 10 by the element 13. This leaves an opening through which may be introduced the required charge of particulate exothermic composition 21. This charge may be applied in an impermeable frangible container. The required amount of water to properly activate the charge may also be introduced either in a free condition or encased in an impermeable frangible second container. If both the charges of exothermic composition 21 and water 22 are in frangible containers they may be superposed or positioned side by side so both containers may be broken and their contents intermingled at a time of need.

It will of course be self-evident that this last described embodiment of the invention apparatus will have significant advantage in a multitude of applications and for products where heat is not normally available at a time of desired use. It will of course be obvious that where circumstances so permit the water or other activating liquid stored in the housing 10 can be placed in a frangible container while the particulate exothermic composition 21 may be introduced in bulk form within the housing 10 and the housing 10 then sealed by application of the bottom closure element 13 in an obvious manner. The only precaution that need be taken in this instance is to avoid moisture containing air of any substance entering the housing 10 during filling thereof.

It is believed the novel method of the invention is clearly evident from the above to include providing a composition comprising a particulate primer material which is exothermic when contacted by water, a particulate inorganic oxide or salt which is highly exothermic when contacted by water and a film forming component which encapsulates said primer material and said inorganic oxide or salt; positioning the packaged product in a container commonly occupied by said composition and within said container bringing said composition into contact with a predetermined amount of water or other activating liquid to produce a mixture thereof and a staged activation of said primer material and said oxide or salt, which is controlled to inhibit the production of steam, and bring said mixture into heat transfer relation to said packaged product by conduction while maintaining the water in said composition under adiabatic conditions. It will be noted that in some instances a liquid other than water per se might be desirable for use in activating the exothermic composition.

Since many different embodiments of the invention and variations in the practice of the method thereof may be made without departing from the spirit and scope thereof, it is to be understood the invention is not limited, except as defined in the appended claims.

What is claimed is:

1. A composition adapted to produce heat when mixed with water, consisting essentially of, in parts by weight:
   1. from about 80 to about 160 parts of a particulate primer material chosen from the class of anhydrous compounds consisting of calcium chloride, cerous chloride, cesium hydroxide, sodium carbonate, ferric chloride, magnesium perchlorate, and mixtures thereof;
   2. from about 25 to about 35 parts of a particulate inorganic oxide or salt chosen from the class of anhydrous compounds consisting of calcium oxide, calcium aluminum hydride, aluminum chloride, calcium nitrate, sulfur trioxide, and mixtures thereof; and
   3. from about 15 to about 50 parts of a film-forming component comprising from about 7 to about 20 parts of positively charged guar gum and from about 8 to about 30 parts of anhydrous sodium tetraborate.

2. The composition of claim 1, wherein said primer is anhydrous calcium chloride, and wherein said inorganic oxide is calcium oxide.

3. The composition of claim 2, wherein said primer is anhydrous calcium chloride, and said inorganic oxide is anhydrous calcium oxide.

4. A composition adapted to produce heat when mixed with water, consisting essentially of, by weight, about 66.7% anhydrous calcium chloride, about 16.7% calcium oxide, about 5.5% positively charged guar gum, and about 11.1% anhydrous sodium tetraborate, said calcium chloride and said calcium oxide being in particulate form and encapsulated by said guar gum and sodium tetraborate.

5. An exothermic composition in the form of a viscous gel producing a relatively uniform temperature up to about 260° F. for a period of up to about 15 minutes without appreciable generation of steam, consisting essentially of, in parts by weight:

1. from about 80 to about 160 parts of particulate primer chosen from the class of anhydrous compounds consisting of calcium chloride, cerous chloride, cesium hydroxide, sodium carbonate, ferric chloride, magnesium perchlorate, and mixtures thereof;
2. from about 25 to about 32 parts of an inorganic oxide or salt chosen from the class of anhydrous compounds consisting of calcium oxide, calcium aluminum hydride, aluminum chloride, calcium nitrate, sulfur trioxide, and mixtures thereof;
3. from about 15 to about 50 parts of a film-forming component comprising from about 7 to about 20 parts of positively charged guar gum and from about 8 to about 30 parts of anhydrous sodium tetraborate; and
4. from about 100 to about 180 parts of water.

* * * * *

UNITED STATES PATENT AND TRADEMARK OFFICE
CERTIFICATE OF CORRECTION

PATENT NO. : 3,903,011
DATED : September 2, 1975
INVENTOR(S) : William R. Donnelly It is certified that error appears in the above-identified patent and that said Letters Patent are hereby corrected as shown below:

Col. 2, line 2, "o" is corrected to read -- of --;

Col. 2, line 3, "o" is corrected to read -- of --;

Col. 2, line 4, "desire" is corrected to read -- desired --;

Col. 2, line 6, "begin" is corrected to read -- begins --;

Col. 2, line 7, "upor" is corrected to read -- upon --;

Col. 2, line 8, "hea" is corrected to read -- heat --;

Col. 2, line 9, "temperatur" is corrected to read -- temperature --;

Col. 2, line 10, "prime" is corrected to read -- primer --;

Col. 2, line 11, "o" is corrected to read -- of --;

Col. 2, line 12, "o" is corrected to read -- or --;

Col. 2, line 45, following "causing" insert -- said --.

Signed and Sealed this seventeenth Day of February 1976

[SEAL]

Attest:

RUTH C. MASON
Attesting Officer

C. MARSHALL DANN
Commissioner of Patents and Trademarks